United States Patent
Ingels

(10) Patent No.: US 11,517,848 B2
(45) Date of Patent: Dec. 6, 2022

(54) NITROGEN ENRICHMENT OF ORGANIC FERTILIZER WITH NITRATE AND AIR PLASMA

(71) Applicant: N2 Applied AS, Oslo (NO)

(72) Inventor: Rune Ingels, Svene (NO)

(73) Assignee: N2 APPLIED AS, Oslo (NO)

(*) Notice: Subject to any disclaimer, the term of this patent is extended or adjusted under 35 U.S.C. 154(b) by 0 days.

(21) Appl. No.: 17/287,260

(22) PCT Filed: Oct. 23, 2019

(86) PCT No.: PCT/NO2019/050228
§ 371 (c)(1),
(2) Date: Apr. 21, 2021

(87) PCT Pub. No.: WO2020/085918
PCT Pub. Date: Apr. 30, 2020

(65) Prior Publication Data
US 2021/0354077 A1    Nov. 18, 2021

(30) Foreign Application Priority Data
Oct. 25, 2018  (NO) .................................. 20181376

(51) Int. Cl.
*B01D 53/14* (2006.01)
*B01D 53/18* (2006.01)

(52) U.S. Cl.
CPC ..... *B01D 53/1493* (2013.01); *B01D 53/1406* (2013.01); *B01D 53/1456* (2013.01); *B01D 53/18* (2013.01); *B01D 2257/402* (2013.01); *B01D 2257/404* (2013.01)

(58) Field of Classification Search
CPC ........ B01D 2258/0266; B01D 2258/06; B01D 2257/406; B01D 2251/21; B01D 2251/504; B01D 53/75; B01D 53/78; B01D 53/1493; B01D 2257/402; B01D 53/1456; B01D 2257/404; B01D 53/1406; B01D 53/18; A61L 9/00; A61L 9/14; A61L 9/16; A61L 11/00; C02F 1/586; C02F 2101/16; C02F 2103/20; C02F 2303/02; Y02C 20/10; Y02P 20/145; C01B 21/02; C01B 21/30; C01B 21/46; C01B 21/40; C01B 21/20
See application file for complete search history.

(56) References Cited

U.S. PATENT DOCUMENTS

| | | | |
|---|---|---|---|
| 2,110,431 A | 3/1938 | Voogd | |
| 3,865,568 A | 2/1975 | Kratzer | |
| 4,276,276 A | 6/1981 | Van Hook et al. | |
| 4,405,254 A * | 9/1983 | Tooley ................... | E04G 7/307 182/186.8 |
| 4,801,356 A * | 1/1989 | Grasso .................... | C02F 1/586 202/202 |
| 5,126,049 A * | 6/1992 | Hallberg ................. | C02F 1/586 210/903 |
| 5,192,355 A | 3/1993 | Eastin | |
| 5,756,058 A * | 5/1998 | Watanabe .......... | B01D 53/1406 423/241 |
| 9,440,889 B2 * | 9/2016 | Ingels ....................... | A61L 9/22 |
| 10,315,941 B2 * | 6/2019 | Kimura ................... | C02F 3/303 |
| 2006/0185517 A1 * | 8/2006 | Nagel ................ | B01D 53/1406 96/275 |
| 2012/0207665 A1 | 8/2012 | Moore | |
| 2015/0299056 A1 | 10/2015 | Ingels | |
| 2018/0071707 A1 | 3/2018 | Salerno | |
| 2021/0162343 A1 * | 6/2021 | Koers ................ | B01D 53/1425 |

FOREIGN PATENT DOCUMENTS

| | | | | |
|---|---|---|---|---|
| CN | 1830526 | | 9/2006 | |
| CN | 102078752 | | 6/2011 | |
| CN | 103920384 | | 7/2014 | |
| CN | 104144710 | | 11/2014 | |
| CN | 106669383 | | 5/2017 | |
| CN | 109 289 474 A | * | 2/2019 | .......... B01D 50/008 |
| EP | 2 788 037 | | 10/2014 | |
| JP | 57-145018 | | 9/1982 | |
| RU | 2 650 545 | | 4/2018 | |
| WO | 92/01922 | | 2/1992 | |

OTHER PUBLICATIONS

International Search Report (ISR) dated Jan. 14, 2020 in International (PCT) Application No. PCT/NO2019/050228.
Norwegian Search Report dated May 22, 2019 in Norwegian Patent Application No. 20181379.
Office Action and Search Report dated May 23, 2022 in corresponding Chinese Patent Application No. 201980078065.9, with English language translation, 15 pages.
Extended European Search Report dated Jul. 6, 2022 in corresponding European Patent Application No. 19876103.3, 8 pages.

* cited by examiner

Primary Examiner — Timothy C Vanoy
(74) Attorney, Agent, or Firm — Wenderoth, Lind & Ponack, L.L.P.

(57) ABSTRACT

The present invention relates to a process suitable for reducing ammonia loss and odor from organic material to the atmosphere. The process comprises feeding air to a plasma generator to produce a concentration of 0.1-12% by volume of NOx in the air by direct nitrogen fixation. Cooled air containing NOx from the plasma generator is fed to an absorption system comprising at least two absorption loops, wherein a first absorption liquid is circulating in the first absorption loop and a second absorption liquid is circulating in the second absorption loop. The air containing NOx is absorbed into the first absorption liquid to form an acidic solution comprising nitrates and nitrites. Off gases containing NO from the first absorption loop is fed to the second absorption loop, and the off gases containing NO are absorbed into the second absorption liquid having a lower pH.

22 Claims, 2 Drawing Sheets

Figur 1
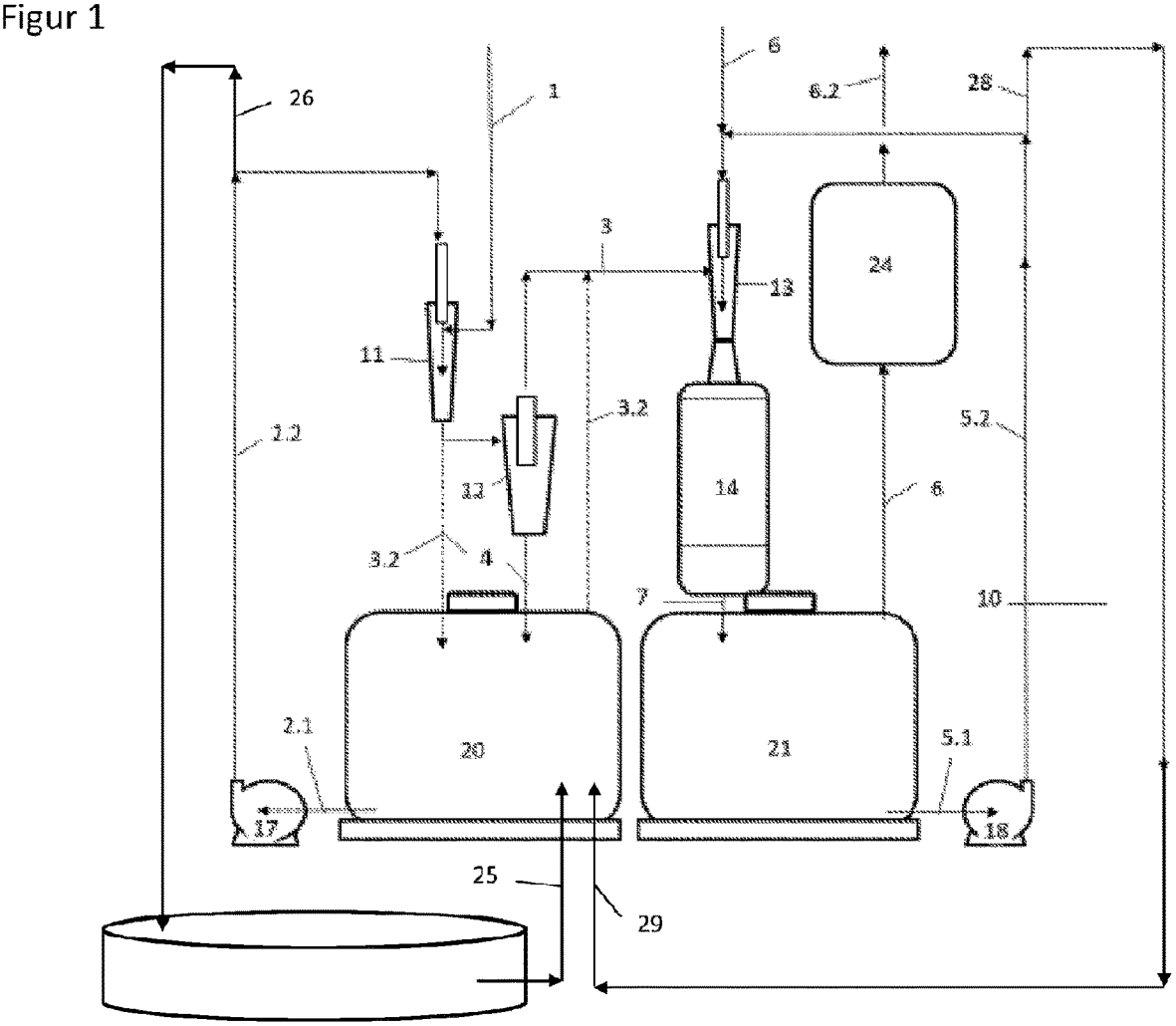

Figur 2
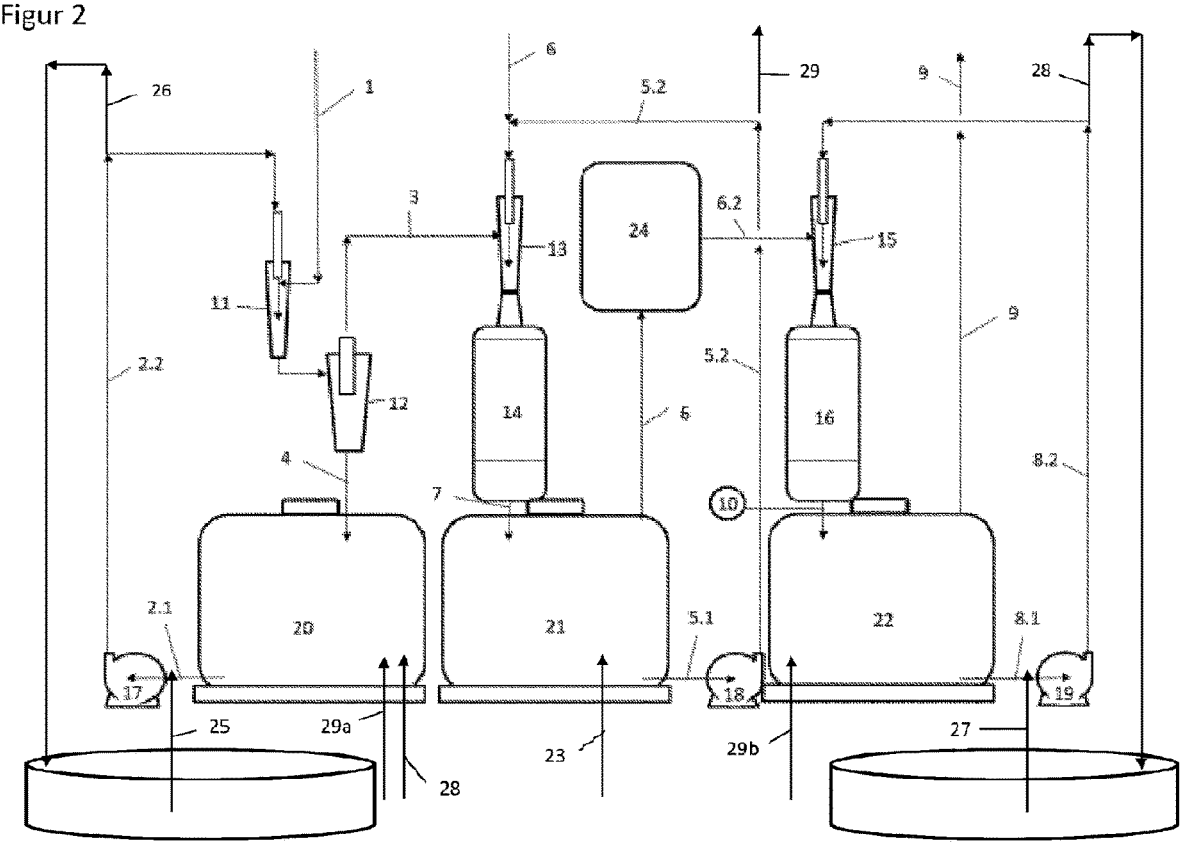

NITROGEN ENRICHMENT OF ORGANIC FERTILIZER WITH NITRATE AND AIR PLASMA

TECHNICAL FIELD

The invention relates to a cost effective process suitable for treating organic material, such as manure, organic waste or biogas-residue, to obtain nitrogen and nitrate enrichment, ammonia loss reduction, inhibition of biological nitrification and de-nitrification, elimination of multi-resistant bacteria and odor elimination.

BACKGROUND OF THE INVENTION

Prior art has not been able to successfully and in a practical way solve the agronomic nitrogen limitation originating from ammonia losses, to meet crop demand as well as the environmental challenges observed when manure and organic waste is used as fertilizer. The ammonia loss from manure and organic waste is in general addressed by applying various chemicals of acidic character, driving pH down to pH 4-5 and or binding ammonia as a salt. Odor has been treated with many standard odors suppressing agents. Ammonia emissions and effluents have been reduced through thermal stripping and subsequent absorption by means of a suitable mineral or organic acid. Air and oxygen treatment and use of oxidizing mineral acids like sulfuric and phosphoric acids have reduced the ammonia loss, but not helped the nutrient balance, not eliminated the odors nor helped stopping primary and secondary $N_2O$ emissions.

EP2788037 A1 "Processes and plants for reducing ammonia loss and odor from organic material or waste to the atmosphere", is describing a process where air plasma or enriched air plasma is used to acidify and produce a concentration of 0.1-12% by volume of NOx in the air by direct nitrogen fixation, absorbing the NOx into an absorption liquid to form an acidic nitrogen solution, and feeding the solution to the organic material or waste. The technique is sensitive to electric power price, energy efficiency and is not giving the optimum acidification reactions.

U.S. Pat. No. 5,192,355 "Manufacturing and using nitrogen fertilizer solutions on a farm" refers to a process where nitrous oxides are produced from an arc system. The oxides are introduced to water to produce an acidic nitrogen solution comprising nitrates and nitrites. To this solution, other reactants are added to produce a liquid fertilizer. The invention is conceptual and producing concentrated nitric acid and mineral fertilizer solutions according to standard industrial principles.

The ammonia loss of 30-40% from the livestock farming, must be compensated from industrially produced ammonia, based on fossil fuels and the Haber Bosch process. The production and logistic cost of this ammonia is creating additional greenhouse gas emissions in the form of $CO_2$ and $N_2O$. The global industrial production of nitrogen fertilizer corresponds to the loss from livestock farms, food waste and low nitrogen use efficiency of mineral fertilizers.

The overall science and chemistry involved can be described in:
1) All organic materials contain chemically bound nitrogen and other nutrients. The nitrogen is in the form of ammonia typically from urea, uric acid and proteins. Organic waste is nutrients and energy on the way to be lost. The best way to recover the nutrients has been to recycle the organic waste and manure back to the fields as fertilizer. This practice has reduced the demand for phosphate fertilizer by 30-40% inside the EU over the last 20 years. However, nitrogen is still being lost. The loss is coming from the microbial enzymatic activity releasing free ammonia, where according to global figures, 30% is lost to air and 10% is lost to water through leaching due to a low Nitrogen Use Efficiency, NUE.

The loss reaction from urine starts with hydrolysation of urea which is described in equation Ia, and the general mineralization of organic material results in ammonium carbonates, aqueous ammonia and carbonic acid which is lost as volatile ammonia and carbon dioxide as in equation Ib.

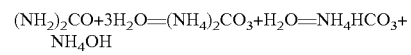

$$(NH_2)_2CO+3H_2O=(NH_4)_2CO_3+H_2O=NH_4HCO_3+NH_4OH \qquad Ia$$

$$2NH_4OH+H_2CO_3=2NH_3(g)+CO_2(g)+2H_2O \qquad Ib$$

The carbon dioxide is very volatile and is directly lost to the air, resulting in an increased pH to 9-10 of the organic material and the subsequent loss of the ammonia, proportional to the initial loss of $CO_2$.
2) The N to $P_2O_5$ ratio in organic material is too low for a balanced fertilization. The content of nitrogen should typically be double of the $P_2O_5$ to meet the nutrient demand of most crops.
3) The ammonia emissions and secondary $N_2O$ emissions from manure processing, storage and field application are significant contributions to global warming. The ammonia emitted from agriculture will be oxidized to nitrates, which create acidic rain, nitrification, and eutrophication and finally de-nitrification. In all these biological processes formation of $N_2O$ takes place and the secondary $N_2O$ formation from ammonia being lost to common biotopes is estimated to be 3-4% of the ammonia lost from the primary agricultural activity.
4) Odor from organic waste is originating from the biological formation of $H_2S$ and other sulfuric components, organic aliphatic acids and amino acids. The lack of oxygen in organic waste and manure is well known to give the basis for $H_2S$ and organic sulfur components with strong odors like skatole, animalistic para cresol-phenolics and 2,4 tert butyl phenol-phenolics, being some typical representatives for bad smell and odors having direct negative environmental and human health effects.
5) Organic material, like manure or organic waste, is often processed in an anaerobic biogas reactor or digester, to take out the energy in the organic material as methane. The methane can be purified and sold as green gas or converted to electricity and fed to the grid. The efficiency of a biogas reactor is normally 60%-80%, measured on how much of the organic material it practically can convert to methane, compared to the theoretical maximum of 100%. This means that 20%-40% of the methane potential is not utilized. In many concepts, the digestate is stored without proper cover and capturing of the remaining methane. During and after spreading the manure, the significant amounts of methane is released. For each kg nitrogen (0.1%=1 kg/ton of manure) produced for acidification, the $CO_2$ footprint is reduced by 25-65 kg $CO_2$-eq.

Prior art is conceptual and has not addressed, nor presented any solution to the practical detailed processing challenges. The present invention is addressing and solving key challenges in using nitrates for acidification of manure, organic waste and bio-residue or digestate.

Commercial nitric acid of 58-70% by wt., or locally produced nitric acid in concentration of 1-30% by wt., is a reactive and dangerous product of pH<1. At this pH, the acid is giving a violent loss-making reaction with the organic material, releasing NO$_x$, NH$_3$ and an ammonium-nitrate and an ammonium-nitrite/nitrate mist.

The application of only nitric acid to acidify manure, organic waste and bio-residue/digestate is not able to stop the formation of N$_2$O from de-nitrification, unless going down to pH 4, due to the lack of HNO$_2$ and reactive air radicals.

The application of only nitric acid solutions to acidify manure, organic waste and bio-residue/digestate, cannot stop the biological activity, nor remove smell and content of poisonous gases.

SUMMARY OF THE INVENTION

The present invention provides a process suitable for reducing ammonia loss and odor from organic material to the atmosphere, comprising: feeding air to a plasma generator to produce a concentration of 0.1-12% by volume of NOx in the air by direct nitrogen fixation; feeding the air containing NOx from the plasma generator to an absorption system comprising at least two absorption loops, wherein a first absorption liquid is circulating in the first absorption loop and a second absorption liquid is circulating in the second absorption loop; absorbing the air containing NOx into the first absorption liquid to form an acidic solution comprising nitrates and nitrites; feeding off gases containing NO from the first absorption loop to the second absorption loop, and absorbing the off gases containing NO into the second absorption liquid having a lower pH than the first absorption liquid; oxidizing remaining NO in off gases from the second absorption loop to NO$_2$.

The first absorption liquid may have a pH of 4-6. In particular, the first absorption liquid may have a pH of 5-6, more particularly, the first absorption liquid may have a pH of 5.5-5.8. The second absorption liquid may have a pH of 2-4. In particular, the second absorption liquid may have a pH of 2-3, more particularly, the second absorption liquid may have a pH of 2-2.75.

The first absorption loop may comprise a first gas mixer or ejector, an optional separator, a first circulation pump and a first circulation tank. Further, the first absorption loop may comprise a separator between the first ejector and the first circulation tank. The second absorption loop may comprise a second ejector, a first absorber, an oxidation device, a second circulation pump and a second circulation tank.

The first absorption liquid may comprise liquid organic material. Further, the second absorption liquid may be an acidic nitrogen solution.

Acid may be added to the second absorption loop, the acid may preferably be selected from nitric acid, sulfuric acid or phosphoric acid.

Off gases containing NO$_2$ from the second absorption loop may be fed to a third absorption loop and absorbed into a third absorption liquid circulating in the third absorption loop.

The third absorption loop may comprise a third ejector, a second absorber, a third circulation pump and a third circulation tank. The third absorption liquid may comprise liquid organic raw material. The third absorption loop may have a pH 7-7.5. In particular, the third absorption liquid may have a pH of 7-7.3, more particularly, the third absorption liquid may have a pH of 7-7.2.

The air fed to the plasma generator may be contaminated air. Off gases from the absorption system may be fed to the plasma generator. The plasma generator may be an electric arc or electromagnetic plasma generator.

The acidic nitrogen solution from the second absorption loop may be passed through a scrubber to absorb ammonia from ammonia contaminated ventilation air from the organic material.

The off gases from the oxidation device may be recycled to the absorption system or vented to atmosphere. Off gas comprising NO$_2$ from the second absorption loop may be fed to a third absorption loop operating at about pH 7-7.5, and remaining NOx may be absorbed and diluted into a raw material tank.

FIGURES

FIG. 1 shows an absorption system comprising two separate absorption loops; one product loop and one acid loop.

FIG. 2 shows an absorption system comprising three separate absorption loops; one product loop, one acid loop, and one nitrite loop.

DETAILED DESCRIPTION

The present invention relates to a process wherein a plasma generator, such as an electric arc, microwave or any other electromagnetic plasma generator, may be applied for treating a liquid phase of organic material, such as organic waste, manure, biogas residue or digestate with a plasma gas mixture comprising nitrogen oxides, NOx, in air. Here NOx is a mix of NO and NO$_2$. The produced plasma gas also contains traces of oxidizing and reducing radicals from air. The plasma generator can produce different concentrations of NOx in air. The highest practical concentration obtainable is 12% by volume, of NOx.

At this concentration, the remaining oxygen is just enough to complete the reaction from NO to HNO$_3$ in water. Se reaction equation II, III and IV.

$$2NO+O_2=2NO_2 \qquad \text{II}$$

$$3NO_2+H_2O=2HNO_3+NO \qquad \text{III}$$

$$4NO+3O_2+2H_2O=4HNO_3 \qquad \text{IV}=3*\text{II}+2*\text{III}$$

The plasma generated NOx gas has a normal concentration of 2-5% by volume in air. The plasma gas with NOx components from the plasma generator is quenched and cooled down to ambient temperature, before it is absorbed into and reacted with an absorption liquid of the selected organic material. The present invention may also combine the functionality of the plasma generator with other sources of acidic nitrogen like nitric acid, or other sources of acids like phosphoric acid or sulfuric acid.

The overall process concept is particularly to absorb NOx from a plasma generator into liquid manure or digestate or any organic waste solution. The process comprises two or optionally three absorption loops. FIG. 1 shows the basic alternative with two absorption loops and FIG. 2 shows the optional alternative with three absorption loops.

In a first embodiment, the process uses two separate absorption loops where the reactive gases from the plasma generator are absorbed into and reacting with an organic material liquid to form a stable ammonium-nitrate and ammonium-nitrite acidic solution in the organic material solution of manure or digestate, see FIG. 1.

Each loop comprises a circulation tank, a circulation pump and an ejector and an absorber unit, for reacting gaseous components into the liquid phase. In each loop, the liquid is circulated from the circulation tank through the ejector and absorber unit and back to the circulation tank. The absorption loops operate at different pH levels to soften and tailor the reactions, avoid foaming and give the right retention time for the required components to be formed to its optimum functionality. Each loop is contacting the liquid phase with the gaseous phase in a two-phase ejector, venturi-mixer or just being mixed in an absorption tower/unit. The gas phase to be treated, is sucked into and mixed with the driving liquid being a liquid flow of pure or partly acidified manure, organic waste and/or bio-residue/digestate. The mechanism of absorbing and reacting the gas components into a liquid is distributing the acidification reaction to the interface between gas and liquid and thereby avoiding tough acid reactions at low local pH. At the same time, the most reactive gas components will react selectively with the surface active polar components in the liquid.

The first absorption loop, hereinafter also called the product loop, absorbs about 90% of the NOx from the air feed flow 1, and comprises a first gas mixer or ejector 11, an optional separator 12, a first circulation pump 17 and a first circulation tank 20.

The first absorption loop is receiving the cold, but reactive gas plasma from the plasma generator as air feed flow 1, and mixing it with an organic liquid flow of intermediate or product. The gas-liquid flow out of the gas mixer or ejector 11 is separated, preferably after a short retention time in a separator 12, e.g. a cyclone, and the gases, mist and foam are transferred through a gas line 3 to the second absorption loop, also called the acid loop, and the liquid phase is going to the first circulation tank 20. Alternatively, the gas-liquid flow out of the first gas mixer or ejector 11 is going directly to the first circulation tank 20, without using the separator 12, e.g. a cyclone, and the gas is going directly from the first circulation tank 20 via line 3.2 to the acid loop. The main reaction in the ejector-separator system is the absorption of $NO_2$ to form $HNO_3$ releasing NO, which becomes part of the gas phase. The second type of reaction in the first absorption loop is related to the exposure of the product flow to the reactive oxidizing and reducing radicals in the plasma.

The gas flow 3 leaving the first absorption loop is air with some NO gas and a watery ammonium nitrate and ammonium nitrite mist and foam. Said gas flow has a large liquid-gas reaction surface and is fed to the second absorption loop.

In the second absorption loop, also called the acid loop, about 99% of the alkaline off gases in the gas flow 3 from the product loop is absorbed, and the remaining NO gas is oxidized to $NO_2$ in an oxidation device 24. The second (acid) absorption loop comprises a second ejector 13, a first absorber 14, an oxidation device 24, a second circulation pump 18 and a second circulation tank 21.

The product loop operates at composition and pH similar to the final product of pH 4-6. The acidic solution 25 comprising nitrates and nitrites is coming from a product tank and the product flow 26 is fed to the product tank.

The acid loop operates at a low pH in the range 2-4. The feed 23 into the second circulation tank 21 may be a watery nitric acid solution and the acidic watery solution 29 coming from the second loop is fed to the product loop.

The acid loop comprises a second ejector 13 driven by a second absorption liquid having a low pH (in the range 2-4) being locally produced from the NO and $NO_2$ in the off gas flow 3 and/or from imported acid, such as nitric acid 23, a first absorber 14 and an oxidation device 24 with sufficient retention time and liquid-gas reaction surface. The main purpose of the second ejector absorber system is to acidify and scrub any ammonia and watery mist from the off gas flow into the liquid phase. The purpose of the second circulation tank 21 is to oxidize the $HNO_2$ to $HNO_3$ at pH=2-4. The purpose of the oxidation device is to oxidize NO to $NO_2$. The second circulation tank 21 can also be used to dissolve or solubilize insoluble phosphates in the manure, organic waste or digestate.

After going through the oxidation device 24, the gas flow 6 from the acid loop may be ventilated (6.1) or recycled (6.2') to the ejector 13, or it optionally goes into a third absorption loop. In the oxidation device 24, NO is oxidized to $NO_2$.

In another embodiment, the absorption system comprises three absorption loops; see FIG. 2. In addition to the product loop and the acid loop described above, a third absorption loop is included.

The first absorption loop, called the product loop, absorbs about 90% the NOx from the air feed flow 1 and comprises a first gas mixer or ejector 11, an optional separator 12, a first circulation pump 17 and a first circulation tank 20.

The second absorption loop, called the acid loop, absorbs about 99% of the alkaline off gases of the gas flow 3 from the product loop and comprises a second ejector 13, a first absorber 14, an oxidation tank 24, a second circulation pump 18 and a second circulation tank 21.

The third absorption loop, called the nitrite loop, absorbs the off gases 6.2 from the oxidation device 24 and comprises a third ejector 15, a second absorber 16, a third circulation pump 19 and a third circulation tank 22.

The nitrite loop operates at a higher pH than the product loop and the acid loop to absorb any remaining and resulting $NO_2$/NO gas. pH of the third absorption liquid circulating in the nitrite loop is in the range about 7-7.5, being lower than the pH of the raw material having a pH of about 8-9, being e.g. liquid manure, digestate or an organic waste solution. The liquid raw material feed flow 27 is fed to the nitrite loop, and the pretreated raw material flow 28 from the nitrite loop is fed the product loop and/or returned to the raw material tank. The purpose of the nitrite loop is to absorb the remaining ppm of NOx at neutral to alkaline pH and stable conditions.

In a system with three absorption loops, the acidic watery solution 29 coming from the second loop is fed as 29a to the first loop and as 29b to the third loop.

The second absorption liquid, i.e. the acidic solution 5.2 circulating in the second loop can be applied for scrubbing ammonia rich gases and/or applied directly to the organic material to bind the volatile ammonia surplus and reduce the odor formation.

The invention can further be used to incinerate smelly air ventilation gases by feeding them to the plasma generator. The plasma generator is sized according to the N-demand for balancing the $N/P_2O_5$ ratio in the organic material and is able to incinerate 10-50 $Nm^3$ of air per kg nitrate-N produced. For each cubic meter of pig slurry, the volume of incinerated air will typically be 50-250 $Nm^3$ and the process will add 0.1-0.5% nitrate-N to the pig slurry.

In the present invention, the main effect of the acidic nitrogen solution is the reaction between the nitric acid and the free ammonia being produced from the decomposition of the organic proteins and urine. Normally 30% of the total nitrogen content is lost to air as ammonia gas because the pH of manure is normally in the range 8-9. The acidic solution comprising nitrates and nitrites is applied to bring the pH down to below 6, which is stopping the ammonia losses to air.

$$HNO_3 + NH_4OH \Rightarrow NH_4NO_3 + H_2O \qquad V$$

The present invention of absorption of plasma and NOx air, directly into the liquid organic material stream, is able to control the ratio of nitrate vs. nitrite. The nitrite reaction VI is an alternative to the nitrate reaction IV.

$$NO + NO_2 + H_2O = 2HNO_2 \qquad VI$$

The purpose of nitrite is to control the biological activity. The biological nitrification (VII) and de-nitrification (VIII) process is one of the main contributors to global warming. The byproduct $N_2O$ has a global warming effect, which is about 260 times the effect of $CO_2$.

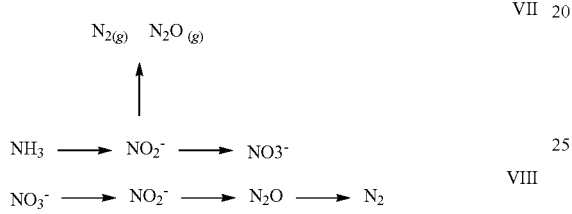

The concentration of nitrous acid is important, as the nitrite ($NO_2^-$) is able to inhibit the microbial de-nitrification of nitrate and nitrite to $N_2$ and $N_2O$. It seems that going from $NO_3^-$ to $N_2$, the intermediate component $NO_2^-$ is inhibiting the de-nitrification if the concentration is higher than 0.01 mole/liter.

By lowering the pH to 4-6 in the circulation tank 20 of the product loop and by keeping a nitrite to nitrate molar ratio of 1/10 to 1/100 to inhibit the de-nitrification as well as any nitrification activity, the formation of $N_2O$ is reduced.

In addition, some de-nitrification and nitrification inhibitors are formed, which give a longer-term effect from spreading to crop uptake. Smelly and potentially harmful organic components and components with strong odors like skatole, animalistic para cresol-phenolics and 2,4 tert butyl phenol-phenolics are quantitatively decomposed. The mechanism of odor and bad smell removal comes from the oxidizing and reducing plasma components in the cold NOx gas, reacting primarily directly at the liquid-gas interface, and secondarily through ions and radicals being formed in the liquid phase.

The $N/P_2O_5$ demand for major crops is in the range of 2, whereas the effective $N/P_2O_5$ ratio in manure is lower than this. The present technology is both adding nitrogen and reducing the loss of nitrogen and solubilizing phosphate.

DESCRIPTION OF REFERENCE NUMBERS IN DRAWINGS

| Flow and Equipment numbers | Description of flow and equipment |
| --- | --- |
| 1 | Air feed flow from the plasma generator. Contains 1-12 vol % NOx |
| 2.1 | The product loop circulation flow going from the first circulation tank 20 to the first circulation pump 17 |
| 2.2 | The product loop circulation flow going from the first circulation pump 17 to drive the ejector 11 |
| 3 | The scrubbed gas flow from the product loop separator 12 to the ejector 13 in the acid loop |
| 3.1 | Optional gas flow from the product loop ejector gas-liquid mixer 11 going to the circulation tank 20 together with the liquid fraction 4 |
| 3.2 | Optional gas flow from the product loop circulation tank 20 to the acid loop ejector gas-mixer 13. 3.2 here represents flow 3 |
| 4 | The liquid fraction from the separator 12 or the ejector 11 to the first circulation tank 20 in the product loop. |
| 5.1 | The acid loop circulation flow going from the second circulation tank 21 to the second circulation pump 18 |
| 5.2 | The acid loop circulation flow going from the second circulation pump 18 to drive the second ejector 13 |
| 6 | The gas flow from the second circulation tank 21 going to the oxidation device 24 in the acid loop |
| 6.1 | The oxidized gas flow leaving the oxidation device 24 to be vented to the atmosphere or recycled to the plasma generator |
| 6.2, 6.2' | The oxidized gas flow 6.2 from the oxidation device 24 in the acid loop to the third ejector 15 in the nitrite loop, or the oxidized gas flow 6.2' to the second ejector 13 in the acid loop. |
| 7 | The liquid flow from the first absorber 14 to the second circulation tank 21 in the acid loop. |
| 8.1 | The nitrite loop circulation flow going from the third circulation tank 22 to the third circulation pump 19 |
| 8.2 | The nitrite loop circulation flow going from the third circulation pump 19 to drive the third ejector 15 |
| 9 | The gas flow from the nitrite tank 22 being vented to the atmosphere or recycled to the plasma generator |
| 10 | The liquid flow for the scrubber 16 to the circulation tank 22 in the nitrite loop. |
| 11 | The ejector in the product loop, being driven by the liquid flow 2.2 sucking in the air feed flow 1 from the plasma generator. |
| 12 | The gas-liquid separator (e.g cyclone), separating the mixed flow from the ejector 11 into the gas flow 3 and the liquid flow 4 |
| 13 | The ejector in the acid loop, being driven by the liquid flow 5.2 sucking in the gas flow 3 from the separator 12 or from the acid loop tank 21 in the product loop |
| 14 | The absorption tower in the acid loop/first absorber giving retention time and gas-liquid contact for the mixed gas-liquid feed from the ejector 13 sending the mixed outlet stream 7 to the second circulation tank 21 |
| 15 | The ejector in the nitrite loop, being driven by the liquid flow 8.2 sucking in the gas flow 6.2 from oxidation device 24 in the acid loop/Second ejector |
| 16 | The absorption tower in the nitrite loop, giving retention time and gas-liquid contact for the mixed feed from the ejector 15 sending the mixed outlet stream 10 to the third circulation tank 22/Second absorber |
| 17 | Circulation pump for the product loop, pressurizing the circulation flow 2.1 to 2.2/First circulation pump |
| 18 | Circulation pump for the acid loop, pressurizing the circulation flow 5.1 to 5.2/Second circulation pump |
| 19 | Circulation pump for the nitrite loop, pressurizing the circulation flow 8.1 to 8.2/Third circulation pump |
| 20 | Circulation tank for the product loop/first circulation tank |
| 21 | Circulation tank for the acid loop/second circulation tank |
| 22 | Circulation tank for the nitrite loop/third circulation tank |
| 23 | Watery nitric acid feed to the second absorption loop, being fed optionally to the second circulation tank 21 and/or to the circulation flow 5.2 to the second ejector 13 |
| 24 | Oxidation device for oxidizing NO to $NO_2$ |
| 25 | Product being recycled and fed to the product loop for reacidification |
| 26 | Product flow being extracted from the product loop |
| 27 | Raw material being fed to the nitrite loop |
| 28 | Pretreated raw material |

| Flow and Equipment numbers | Description of flow and equipment |
| --- | --- |
| 29 | Acidic watery solution extracted from acid loop, being split into 29a going to the product loop and 29b going to the nitrite loop |
| 29a | Acidic watery solution from the acid loop going to the circulation tank in the product loop |
| 29b | Acidic watery solution from the acid loop going to the circulation tank in the nitrite loop |

Flow Explanations:

Flow numbers stated as 1.1 and 1.2 and 1.3 have the same mass flow and chemical composition, but have different physical properties like pressure, temperature and gas liquid composition. Flow numbers stated as 1, 1a and 1b have the same chemical composition, where 1 is the sum of 1a and 1b.

The invention claimed is:

1. A process suitable for reducing ammonia loss and odor from organic material to the atmosphere, comprising
feeding air to a plasma generator to produce a concentration of 0.1-12% by volume of NOx in the air by direct nitrogen fixation;
feeding the air containing NOx from the plasma generator to an absorption system comprising at least two absorption loops, wherein a first absorption liquid is circulating in the first absorption loop and a second absorption liquid is circulating in the second absorption loop;
absorbing the air containing NOx into the first absorption liquid to form an acidic solution comprising nitrates and nitrites;
feeding off gases containing NO from the first absorption loop to the second absorption loop, and absorbing the off gases containing NO into the second absorption liquid having a lower pH than the first absorption liquid;
oxidizing remaining NO in off gases from the second absorption loop to $NO_2$.

2. The process of claim 1, wherein the first absorption liquid has a pH of 4-6.

3. The process of claim 1, wherein the second absorption liquid has a pH of 2-4.

4. The process according to claim 1, wherein the first absorption loop comprises a first gas mixer or ejector, an optional separator, a first circulation pump and a first circulation tank.

5. The process according to claim 4, wherein the first absorption loop further comprises a separator between the first ejector and the first circulation tank.

6. The process according to claim 1, wherein the second absorption loop comprises a second ejector, a first absorber, an oxidation device, a second circulation pump and a second circulation tank.

7. The process of claim 1, wherein the first absorption liquid comprises liquid organic material.

8. The process of claim 1, wherein the second absorption liquid is an acidic nitrogen solution.

9. The process of claim 1, wherein acid is added to the second absorption loop.

10. The process of claim 9, wherein the acid is selected from nitric acid, sulfuric acid or phosphoric acid.

11. The process of claim 1, wherein off gases containing $NO_2$ from the second absorption loop are fed to a third absorption loop and absorbed into a third absorption liquid circulating in the third absorption loop.

12. The process of claim 11, wherein the third absorption loop comprises a third ejector, a second absorber, a third circulation pump and a third circulation tank.

13. The process of claim 11, wherein the third absorption liquid comprises liquid organic raw material.

14. The process of claim 11, wherein the third absorption loop has a pH 7-7.5.

15. The process of claim 14, wherein the third absorption loop has a pH 7-7.3.

16. The process of claim 14, wherein the third absorption loop has a pH 7-7.2.

17. The process of claim 1, wherein the air is contaminated air.

18. The process of claim 1, wherein off gas comprising $NO_2$ from the second absorption loop is fed to a third absorption loop operating at about pH 7-7.5, and remaining NOx is absorbed and diluted into a raw material tank.

19. The process of claim 1, wherein the first absorption liquid has a pH of 5-6.

20. The process of claim 1, wherein the first absorption liquid has a pH of 5.5-5.8.

21. The process of claim 1, wherein the second absorption liquid has a pH of 2-3.

22. The process of claim 1, wherein the second absorption liquid has a pH of 2-2.75.

\* \* \* \* \*